United States Patent
Moganti

(10) Patent No.: US 6,229,878 B1
(45) Date of Patent: May 8, 2001

(54) TELEPHONE ANSWERING METHOD AND APPARATUS

(75) Inventor: Madhav Moganti, Tinton Falls, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/010,051

(22) Filed: Jan. 21, 1998

(51) Int. Cl.[7] .......................... H04M 1/64; H04M 11/00; H04M 1/00
(52) U.S. Cl. .................... 379/67.1; 379/76; 379/88.22; 379/100.06; 379/164
(58) Field of Search .................... 379/67.1, 68, 76, 379/88.11–88.13, 88.19–88.22, 88.2, 93.01, 93.17, 93.23, 93.09, 93.34–93.35, 165, 164, 158, 161, 177, 100.06, 100.16, 377, 385, 93.24, 100.01, 100.08, 100.09, 100.14

(56) References Cited

U.S. PATENT DOCUMENTS

| | | | | |
|---|---|---|---|---|
| 4,273,960 | | 6/1981 | Fahey et al. ..................... | 179/5 R |
| 4,897,866 | | 1/1990 | Majmudar et al. ................ | 379/94 |
| 4,942,598 | * | 7/1990 | Davis .............................. | 379/57 |
| 4,985,913 | * | 1/1991 | Shalom et al. .................... | 379/76 |
| 5,276,731 | * | 1/1994 | Arbel et al. ...................... | 379/88 |
| 5,327,486 | * | 7/1994 | Wolff et al. ...................... | 379/96 |
| 5,388,150 | * | 2/1995 | Schneyer et al. ................. | 379/67 |
| 5,434,908 | * | 7/1995 | Klein .............................. | 379/88 |
| 5,506,891 | * | 4/1996 | Brown ............................. | 379/100.06 |
| 5,712,901 | * | 1/1998 | Meermans ....................... | 379/88 |
| 5,822,406 | * | 10/1998 | Brown ............................. | 379/88 |
| 5,881,543 | * | 3/1999 | Johnson .......................... | 379/177 |
| 5,937,039 | * | 8/1999 | Cho ................................ | 379/93.17 |
| 6,052,442 | * | 4/2000 | Cooper et al. .................... | 379/88.19 |

* cited by examiner

*Primary Examiner*—Fan Tsang
*Assistant Examiner*—Allan Hoosain

(57) ABSTRACT

An improved telephone answering machine uses a personal computer or work station to analyze incoming caller data. Calls to be automatically answered by the answering machine can be answered with the accompaniment of a customized announcement to the caller based upon the caller's phone number, name or other data item received by the telephone answering device. Messages to be left by a caller can be stored on a computer storage media, including being segregated by calling number, name or other criteria. The improved answering machine includes the ability to retrieve messages from particular callers.

25 Claims, 2 Drawing Sheets

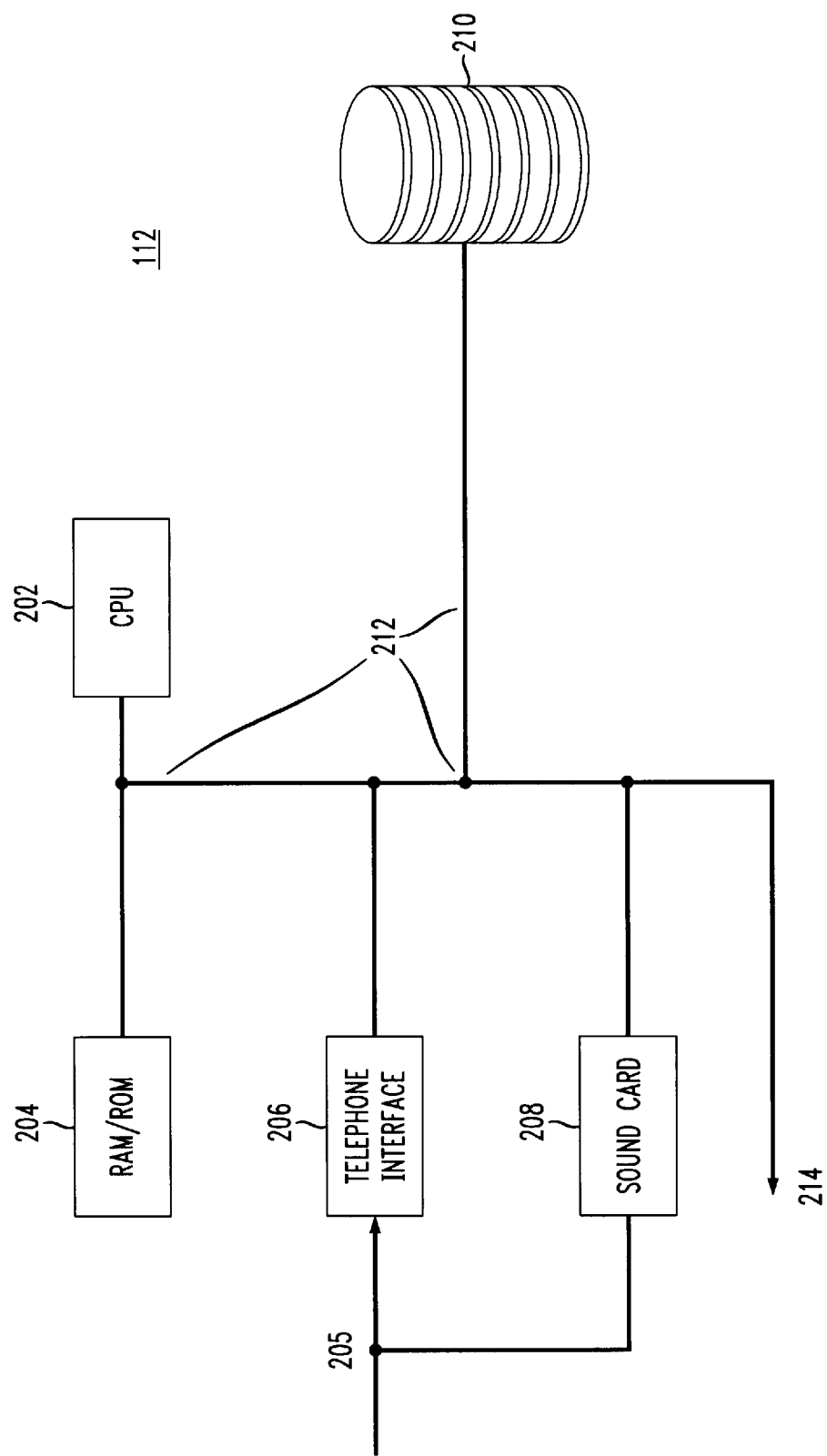

TELEPHONE ANSWERING METHOD AND APPARATUS

FIELD OF THE INVENTION

This invention relates to telephone answering machines. In particular, this invention relates to an improved method and apparatus for automatically answering telephone calls.

BACKGROUND OF THE INVENTION

Telephone answering machines are well known. Answering machines typically answer an incoming telephone call upon a predetermined number of rings on a telephone line that the answering machine is connected to. After so many rings have occurred the machine will go "off-hook" answering the incoming call. A pre-recorded message is played to the caller, at the conclusion of which the caller may leave a message that is recorded on either a magnetic tape or stored in an electronic memory device. Messages left on the machine can be replayed at a later time. Many prior art answering machines also include the ability to replay or retrieve messages remotely by entering one or more keystrokes into a telephone placing a call that the machine has answered.

Prior art answering machines treat all incoming calls alike. In many instances and for a variety of reasons, it might be desirable to have an answering machine not answer an incoming call, either from a particular calling party or at a particular time. Similarly, it might be desirable to have a calling party get a particular announcement message customized for that particular caller. It might also be preferable or desirable to segregate messages from one or more parties from the others, in part, to expedite the review thereof.

An answering machine or methodology by which calls could be selectively responded to on the basis of the calling party would be an improvement over the prior art. Accordingly, it is an object of the present invention to provide an improved method and apparatus to selectively answer incoming telephone calls, selectively play an announcement on the basis of the calling party's identity, and to record messages from calling parties based in part on the identity of that calling party.

SUMMARY OF THE INVENTION

An improved telephone answering device is comprised of a personal computer that includes circuitry to interface the computer to telephone signals on the telephone line. If the telephone line is a so-called ISDN (integrated services digital network) line, or a plain old telephone service line (POTS) that provides data as a service known as "caller ID," data transmitted on the line and processed by the computer can be used to decide to answer a call or not answer a call, among other things, based at least in part upon the identity of the calling party. A computer can be programmed to analyze incoming ISDN data or caller ID data and, if necessary, reproduce a recorded response specifically tailored to the identity of the calling party stored on an appropriate mass storage device of the computer. Messages can be left by the calling party on an appropriate storage media of the computer. Messages might be stored as digital representations thereof on a digital storage media, or be recorded in an analog format, e.g. on a tape, under control by the computer. By receiving telephone signals and analyzing the data thereon, the computer can selectively answer a call and customize a response based upon data of the calling party.

Messages can be retrieved locally directly from the computer, or remotely dialing up the phone number of the computer and logging into the computer and entering predetermined signals or digits from the calling phone which the computer can be programmed to recognize and thereafter select messages to be replayed. Alternatively, messages might be retrieved from the computer by remotely accessing the computer from another computer to download files containing stored messages. Access to the Improved Telephone Answering Apparatus might be achieved using a web browser. In addition to answering calls, the device disclosed herein might be used to automatically dial another number and to forward thereto, messages left on the answering computer.

The method and apparatus disclosed herein is intended to be used with an ISDN (integrated services digital network) telephone line as well as a plain old telephone service (POTS) line that has caller ID service. The computer can be programmed to answer a call based upon the calling party's name, number or any other detectible data received from the phone line. Well known ISDN telephone lines also provides such data and could also be used with the invention disclosed.

BRIEF DESCRIPTION OF THE DRAWING

FIG. 2 shows a simplified functional block diagram of a computer and some of the constituent elements necessary to implement an improved telephone answering device.

DETAILED DESCRIPTION OF THE PREFERRED EMBODIMENT

Figure 1:
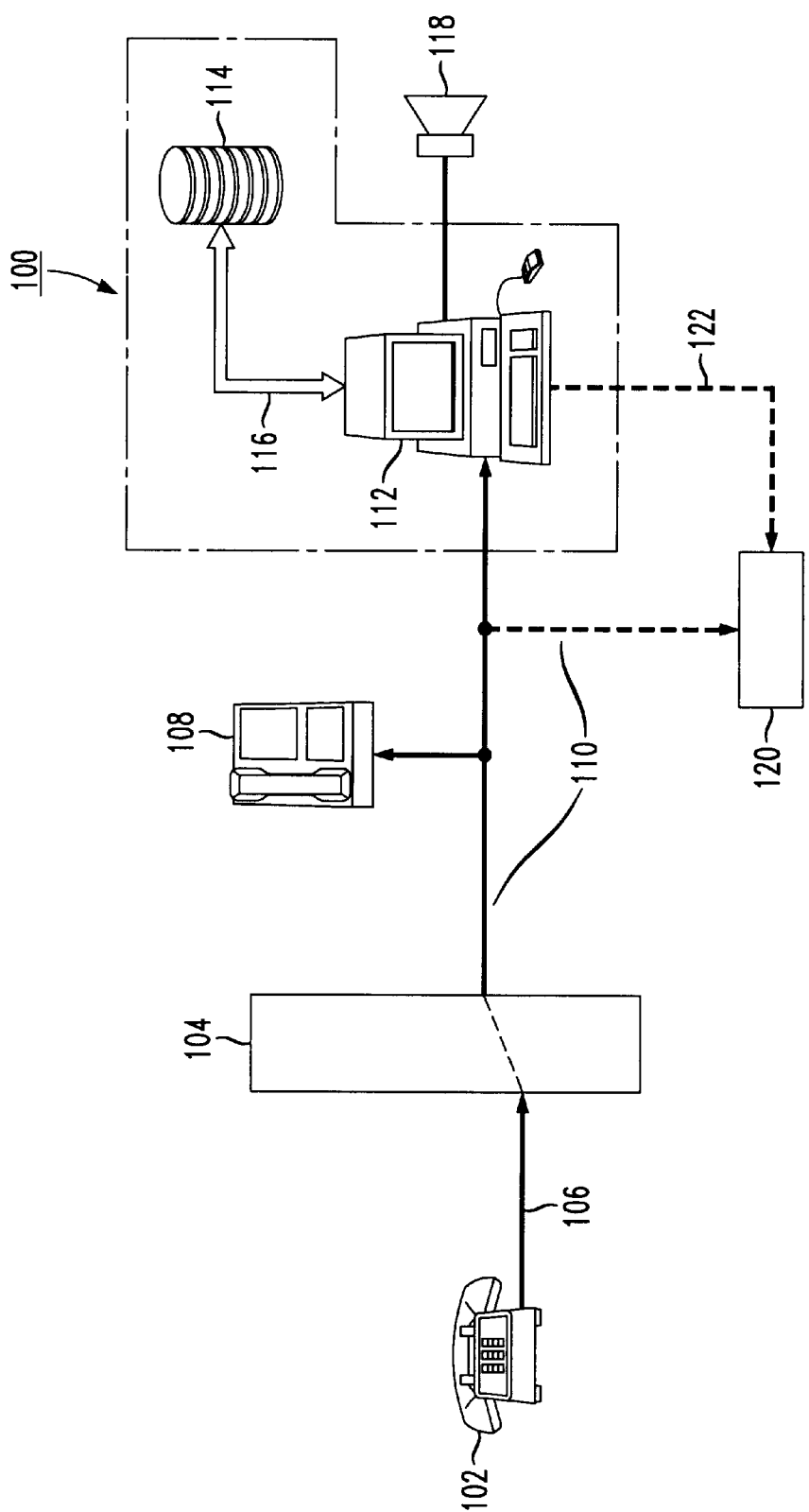
FIG. 1 shows a simplified block diagram of the improved telephone answering device in a simplified telephone network.

FIG. 1 shows a simplified block diagram of an improved telephone answering device 100. The answering device 100 is comprised of a computer 112 that includes a data storage device, either internal to the computer or external 114 as shown.

The computer 112 might be either a well-known desktop computer but might also include more powerful computers known as work stations. Personal computers and work stations typically include mass storage devices known as hard disk drives but might also include bulk storage media such as backup tapes or other random access backup storage devices that can store files that include digitized voice signals. Alternatively, the computer 112 might have an externally located disk storage device or magnetic tape or other storage media 114 that the computer is coupled to using an appropriate data bus 116. —In FIG. 1, a calling party 102 coupled to a telephone office 104 through a telephone line 106 has a call routed through the telephone office 104 to an ISDN telephone line 110 linking the telephone office to the called party's phone 108. Electrical signals on the ISDN telephone line 110 cause the telephone 108 in the called party's location to ring. ISDN data and more recently, caller ID data on POTS lines is included with the electrical signals ringing telephone 110. Data sent to the subscriber with caller ID service or on an ISDN line includes the phone number of the calling party 102 but also might include the name and/or address of the called party as well. ISDN data and caller ID data is well known and is sent to the party being called, prior to when the call is answered.

By appropriately programming a computer 112 that includes an ISDN telephone interface, a sound card, and appropriate software, the computer 112 can be programmed to analyze incoming caller ID data on the telephone line 110; answer an incoming call; play a pre-recorded message; and record a message from the caller. By appropriately programming the computer 112, it can analyze incoming data on an ISDN telephone line or caller ID data on a standard telephone line and provide other features and capabilities set forth below that are not presently available in automatic answering machines or caller ID display units which only display data on incoming calls.

Several announcement messages might be digitized and saved on the computer's hard disk drive 114. Computer software within the computer 112 can effect the selection of a particular prerecorded announcement from the hard disk drive 114 in response to a particular incoming phone number or caller. The several announcement messages can be used to produce customized announcement messages to callers based upon the incoming number detected by the computer 112. Incoming calls might also be answered differently according to the time day, day of the week, or other basis. For example, an incoming call from a phone number belonging to a family member could be responded to by an appropriate announcement message specifically tailored to such callers. Incoming calls from unidentified numbers, or business callers, for example, might be answered differently by the computer replaying a different message stored on the disk media 114. A unique announcement message could be replayed to a caller 102 based upon that caller's phone number and/or his name and/or address.

In addition to customized announcement messages to callers 102, the computer 112 could be programmed to selectively record calls from a particular number or particular numbers as a group. For instance, calls from a particular number could be batched and stored together on the storage media 114 for subsequent retrieval by the subscriber. In this fashion, all of the calls relating to a particular calling party could be replayed together, disregarding messages from other callers. Such selective reproduction of stored messages would reduce the time required to replay all messages serially as is now required on prior art answering machines. The computer 112 could also be programmed to ignore calls from predetermined callers. Unwanted calls could be screened such that the computer does not answer unwanted calls at all.

FIG. 2 shows a simplified block diagram of a computer and the constituent parts of an improved telephone answering apparatus.

An appropriate central processor 202 executes instructions stored in RAM or ROM 204. These instructions would give the CPU 202 control and access to an appropriate telephone interface circuit 206 via the address and control lines of the CPU 202. The interface circuit 206 couples a telephone line 205 to the computer 100, shown in FIG. 1.

The telephone interface circuit 206 needs to recognize the ringing signal on the phone line 205 that rings a telephone subscribers phone. After a predetermined number of rings has been detected by the telephone interface 206, the telephone interface 206 goes off-hook, effectively answering the incoming call. In response to the incoming call that is so answered, the CPU 202 causes an audible response to be produced to the caller through a conventional sound card 208.

The CPU 202 could monitor the telephone interface 206 by periodicall polling it for a status signal indicating that the telephone interface 206 has detected ringing and/or answered an incoming call. Alternatively, the telephone interface 206 could request attention from the CPU by asserting a processor interrupt control line to cause the CPU 202 to take control of the telephone interface 206 and attend to the incoming call. In either case, presentation of a digitized representation of an announcement could be synthesized by the CPU sending appropriate data to the sound card. Messages left by a caller can be retrieved from the telephone interface 206, processed into data and stored on a mass storage device 210.

Based upon data received at the telephone interface 206, announcements played through the sound card can be selected from several such messages stored on the disk 210. A call from a family member identified as such by the phone number data received over the telephone line 205 and recognized by the computer 100 could cause the CPU to select a specific announcement from several announcement messages stored on disk 210. Business calls might be responded to by other messages.

Incoming messages left by callers can be logically grouped on the disk 210. Related messages or messages from one or more related callers could be selectively replayed by replaying files that are logically grouped together. Incoming messages can be segregated on the basis of the calling number, time of day, or other data retrieved from the incoming data over the telephone line 205.

The embodiment herein contemplates use with an ISDN subscriber line but also contemplates use with POTS lines having caller ID data available. Standards for the format of such data is prior art and well-known.

The preferred embodiment of the invention contemplates functionality of an answering machine implemented in a personal computer, a device that is now nearly ubiquitous. Alternate embodiments would include devices 120 under the control of the computer 112 through an appropriate control bus 122 to play back announcement messages on a preselected basis and to record messages as well. Such an embodiment would require some additional complexity to provide the flexibility of the previously described computer 112.

A computer that has prerecorded announcement messages and which records incoming messages would, of course, include the ability to replay such messages through a speaker 118 or other appropriate device. Those skilled in the art will also recognize that the ability to replay messages from an answering machine is significantly more valuable if messages can be retrieved remotely. With respect to FIG. 1, messages stored on the approved answering machine system 100 could be retrieved from a remote location, such as the subscriber telephone 102 merely by dialing the phone number of the telephone 108. When the improved telephone answering machine system 100 answers, a subscriber at the remote location 102 need only enter a predetermined security code that would cause the computer 112 to identify if any messages were stored, the identity of the caller who left messages, and to selectively play back one or more stored messages.

As set forth above, messages can be retrieved by remotely dialing into the computer and entering predetermined signals or digits from the calling phone into the computer which the computer can be programmed to recognize and thereafter play back messages. Alternatively, messages might be retrieved from the computer by remotely accessing the computer from another computer to download files containing stored messages. Access to the Improved Telephone Answering Apparatus and message retrieval might be achieved using a web browser and internet access to transfer message files from the computer storing messages and another computer.

In addition to answering calls, the device disclosed herein might be used to automatically dial another number and to forward thereto, messages left on the answering computer. Such message forwarding could be accomplished by transferring computer files containing stored messages from callers as well as the pre-recorded message that was played to the caller by the computer.

Announcement messages played back to callers might be stored as data files that represent digitized messages that are formatted into digital data. Alternatively, announcement messages could be typed-in ASCII text that is synthesized into speech using well-known speech synthesis technology.

In the event a caller to the apparatus disclosed herein does not include the aforementioned data, the computer could certainly be programmed to answer an incoming call and play a generic or default message and thereafter record any message. As an alternative, the computer might ignore incoming calls that do not provide caller identification data and permit a conventional answering machine to answer the call thereby conserving disk, or other storage device, storage space.

Unlike prior art, which uses large telephone switching systems to provide some of the features described herein, the method and apparatus disclosed herein uses the inexpensive and nearly ubiquitous personal computer to provide complex automated answering service. Complex and expensive telephone central office equipment need not be employed.

What is claimed is:

1. A telephone answering device comprised of:
   i) a personal computer means coupled to a telephone office via a telephone line for use with a telephone coupled separately to said telephone line, said computer means for:
      A) receiving telephone ringing signals having a repeated number of rings on said telephone line;
      B) analyzing data signals received from said telephone line that at least partially identify a calling party prior to answering said call;
      C) answering at least some received telephone calls in response to analyzed data signals received on said telephone line after a predetermined number of the repeated number of rings, and said telephone was not answered;
      D) receiving a message over said telephone line aft answering a call and formatting said message received for storage;
   ii) data storage means, coupled to said computer means, for storing information received by said computer means
   iii) telephone line interface means for coupling said telephone line to said computer means.

2. The telephone answering device of claim 1 wherein said computer means includes: means for selectively answering telephone calls in response to ISDN data received from telephone line.

3. The telephone answering device of claim 1 wherein said computer means includes: means for selectively answering telephone calls in response to caller ID data received from said telephone line.

4. The telephone answering device of claim 1 further including: means for producing at least one stored announcement message to a caller after answering a telephone call.

5. The telephone answering device of claim 1 further including means for selectively producing to a caller in response to predetermined data received from said telephone line, at least one announcement message after answering a telephone call.

6. The telephone answering device of claim 1 further including means for audibly reproducing messages stored on said data storage means.

7. The telephone answering device of claim 1 wherein said computer means includes: means for selectively reproducing messages stored on said data storage means according to a predetermined data element received from said telephone line.

8. The telephone answering device of claim 1 wherein said computer means includes means for converting messages stored on said data storage means into text.

9. The telephone answering device of claim 1 wherein said computer means includes means for converting text into audible messages.

10. The telephone answering device of claim 1 wherein said computer means includes means for converting text into an audible announcement.

11. The telephone answering device of claim 1 wherein said computer means for analyzing data received from said telephone line analyzes data that includes the phone number of a calling party.

12. The telephone answering device of claim 1 wherein said computer means for analyzing data received from said telephone line analyzes data that identifies the name of a calling party.

13. The telephone answering device of claim 1 wherein said computer means coupled to a telephone office via a telephone line, is coupled to an ISDN telephone line.

14. A telephone answering device comprised of:
   i) a personal computer coupled to a telephone office through a telephone line for use with a tone coupled separately to said telephone line and for receiving telephone signals with a number of ring signals on said telephone line rings, and said telephone has not been answered; and said computer programmed to analyze incoming data on said telephone line, said data comprised of the name and phone number of a calling party, said personal computer,
   ii) a data storage device coupled to said personal computer on which an announcement message is stored and on which varying length voice message are stored;
   iii) an ISDN telephone line interface circuit receiving data on said telephone line and coupling said data to said computer after a predetermined number of the number of ring signals.

15. A telephone answering device comprised of:
   i) a personal computer coupled to a telephone office through a telephone line for use with a telephone coupled separately to said telephone line, receiving telephone signals with a plurality of ring signal on said telephone line and programmed to analyze incoming data on said telephone line after a predetermined number of the plurality of ring signals rings and said telephone was not answered; said data comprised of the name and phone number of a calling party, said personal computer flier comprising;
   ii) a data storage device coupled to said personal computer on which an announcement message is stored and on which varying length voice messages are stored
   iii) an ISDN telephone line interface circuit receiving data on said telephone line and coupling said data to said computer.

16. A method of automatically selectively answering a telephone call using a personal computer coupled to a telephone office through a telephone line for use with a telephone coupled separately to said telephone line comprised of:

i) receiving telephone signals having a plurality of rings on said telephone line by said computer wherein said telephone was not answered;

ii) analyzing data received from said telephone line;

iii) selectively answering a telephone call in response to said telephone signals on said telephone line after a predetermined number of the plurality of rings;

iv) receiving information sent from said telephone office on said telephone line after answering a call;

v) formatting said information received for storage on a data storage device.

17. The method of claim 16 further comprised of: selectively answering a telephone call in response to data received on said telephone line.

18. The method of claim 16 further comprised of: selectively answering a telephone call in response to data received on said telephone line and selectively producing at least one announcement of a plurality of announcements to a caller based in part on data received on said telephone line.

19. The method of claim 16 further including the steps of: retrieving data stored on a storage device and of reproducing an audio message from said caller.

20. The method of claim 16 further including the step of converting data stored on a storage device into text.

21. The method of claim 16 further including the steps of: remotely accessing said computer from a second computer and retrieving stored messages therefrom.

22. The method of claim 16 further including the steps of: downloading files from said computer into a second computer.

23. The method of claim 16 further including the steps of: retrieving files from said computer over a data network.

24. The method of claim 16 further including the steps of: forwarding an incoming telephone call to another telephone number by said computer.

25. The method of claim 16 further including the steps of: presenting a default message to calls that do not have accompanying caller ID data.

* * * * *